(12) United States Patent
Bultel

(10) Patent No.: US 10,858,124 B2
(45) Date of Patent: Dec. 8, 2020

(54) REMOVABLE ORBITAL TOWING ASSISTANCE DEVICE, AND RELATED METHOD

(71) Applicant: CENTRE NATIONAL D'ETUDES SPATIALES, Paris (FR)

(72) Inventor: Pascal Bultel, Pontault-Combault (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 954 days.

(21) Appl. No.: 15/303,898

(22) PCT Filed: Apr. 3, 2015

(86) PCT No.: PCT/EP2015/097021
§ 371 (c)(1),
(2) Date: Oct. 13, 2016

(87) PCT Pub. No.: WO2015/158932
PCT Pub. Date: Oct. 22, 2015

(65) Prior Publication Data
US 2017/0029138 A1 Feb. 2, 2017

(30) Foreign Application Priority Data
Apr. 17, 2014 (FR) ...................... 14 53515

(51) Int. Cl.
*B64G 1/00* (2006.01)
*B64G 1/40* (2006.01)
(Continued)

(52) U.S. Cl.
CPC ............. *B64G 1/007* (2013.01); *B64G 1/402* (2013.01); *B64G 1/646* (2013.01); *B64G 2001/1092* (2013.01)

(58) Field of Classification Search
CPC ........ B64G 1/007; B64G 1/1078; B64G 1/14; B64G 1/402; B64G 1/646
See application file for complete search history.

(56) References Cited

U.S. PATENT DOCUMENTS 4,471,926 A 9/1984 Steel, III
4,664,343 A * 5/1987 Lofts ...................... B64G 1/007
244/171.1

(Continued)

FOREIGN PATENT DOCUMENTS

WO 8601484 A1 3/1986

OTHER PUBLICATIONS

International Search Report for Application No. PCT/EP2015/097021 dated Jun. 22, 2015.

*Primary Examiner* — Richard R. Green
(74) *Attorney, Agent, or Firm* — Burris Law, PLLC

(57) ABSTRACT

The invention relates to a method for transferring a space payload from a first orbit to a second orbit. Said method is characterized in that the space payload, moving about the first orbit, is attached to a removable orbital towing assistance device including at least one fuel pouch. Said method includes the steps of: —attaching (E1) an orbital transfer vehicle to the removable orbital towing assistance device; and —transferring (E2) the space payload and the removable orbital towing assistance device to the second orbit by means of the orbital transfer vehicle. The invention also relates to a removable orbital towing assistance device intended for a space payload and an orbital transfer vehicle and enabling direct supply of fuel to the vehicle and/or the space payload.

4 Claims, 5 Drawing Sheets

(51) Int. Cl.
*B64G 1/64* (2006.01)
*B64G 1/10* (2006.01)

(56) References Cited

U.S. PATENT DOCUMENTS

| | | | |
|---|---|---|---|
| 4,880,187 A | 11/1989 | Rourke et al. | |
| 6,149,104 A | 11/2000 | Soranno | |
| 6,581,882 B2 * | 6/2003 | Valentian | B64G 1/401 244/158.4 |
| 6,739,555 B2 * | 5/2004 | Mazanek | B64G 1/1078 244/172.4 |
| 7,163,179 B1 * | 1/2007 | Taylor | B64G 1/1078 244/159.2 |
| 7,575,200 B2 * | 8/2009 | Behrens | B64G 1/1078 244/172.3 |
| 9,676,499 B2 * | 6/2017 | Myers | B64G 1/1078 |
| 2003/0025037 A1 | 2/2003 | Mazanek et al. | |
| 2007/0051854 A1 | 3/2007 | Behrens et al. | |
| 2008/0121760 A1 | 5/2008 | Lundgren | |

* cited by examiner

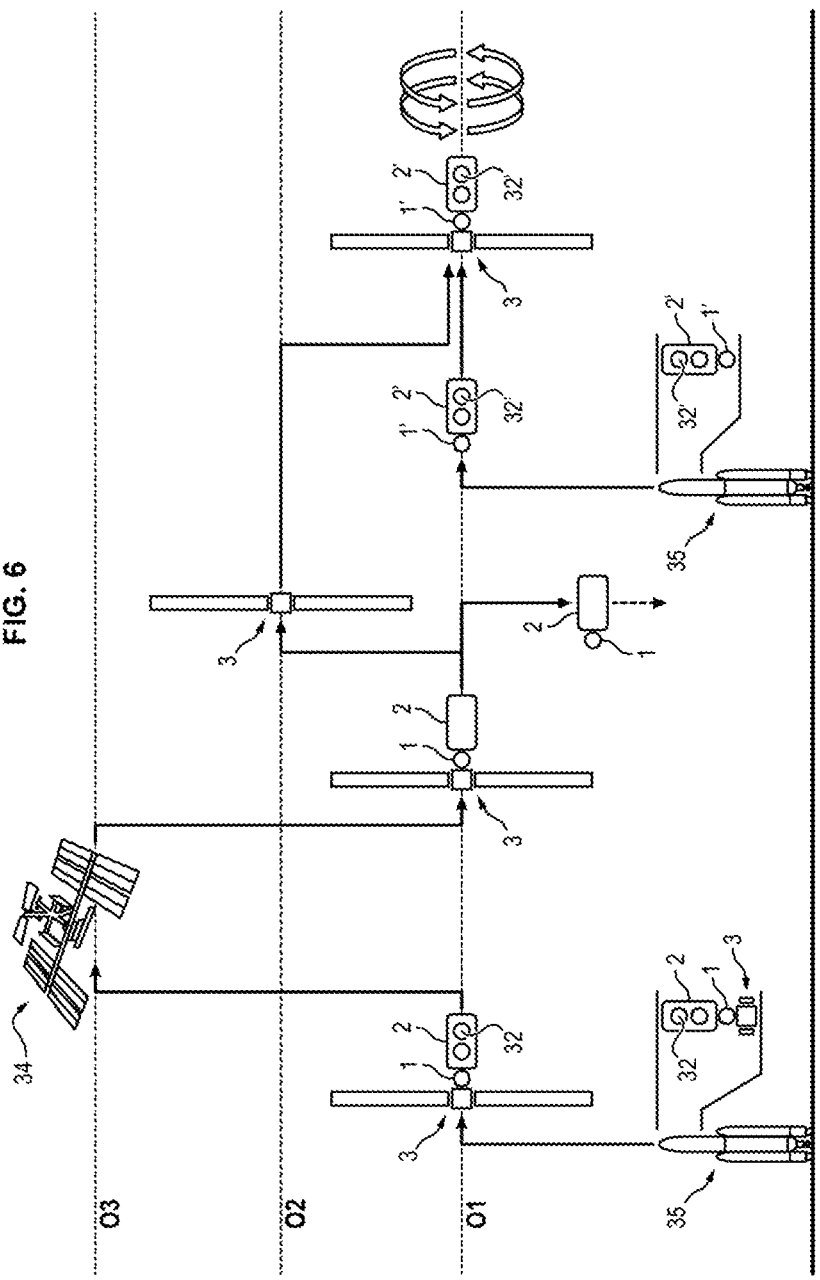

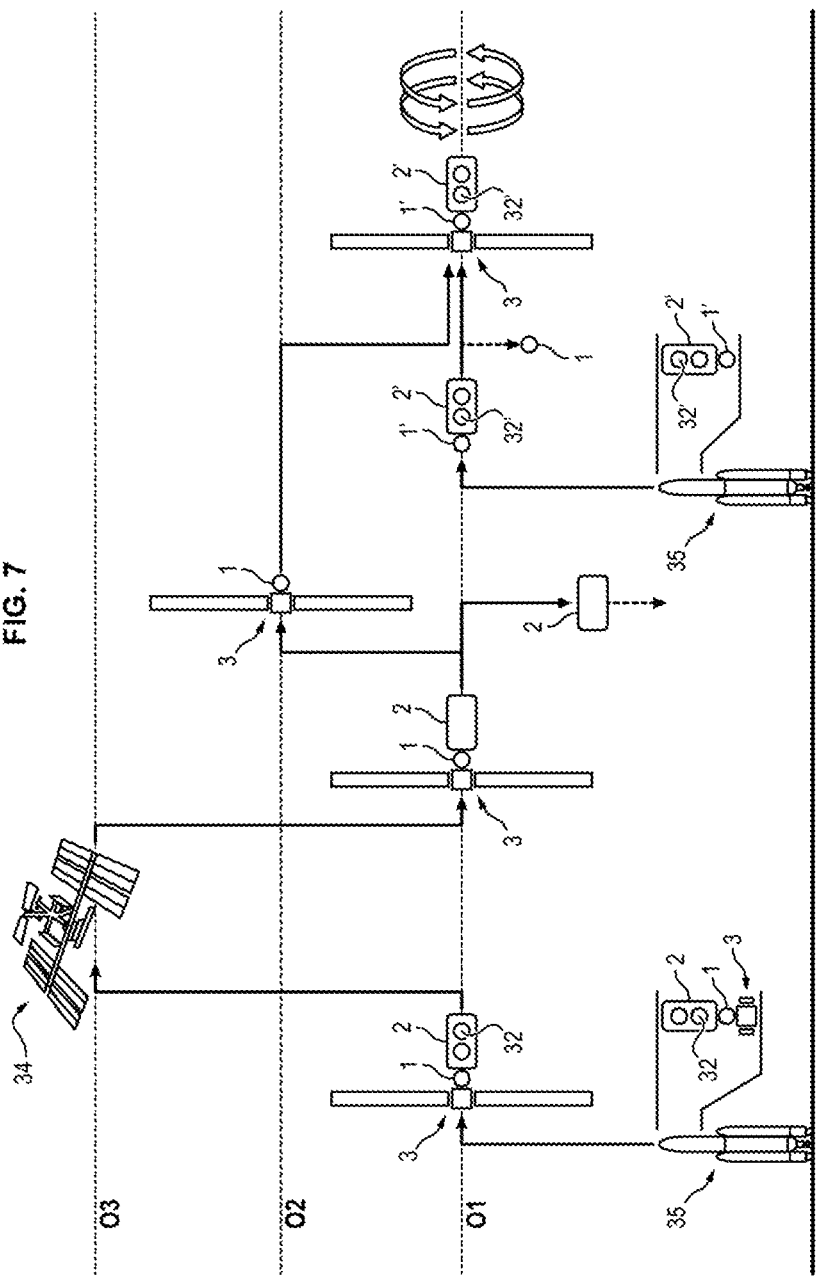

REMOVABLE ORBITAL TOWING ASSISTANCE DEVICE, AND RELATED METHOD

CROSS REFERENCE TO RELATED APPLICATIONS

The present application is a national phase entry under 35 U.S.C. § 371 of International Application No. PCT/EP2015/097021, filed Apr. 3, 2015, which claims priority from French Patent Application No. 1453515, filed Apr. 17, 2014, published in French, the disclosures of which are incorporated by reference herein.

GENERAL TECHNICAL FIELD

This invention relates to an orbital towing assistance device for space payloads to be used in conjunction with an orbital transfer vehicle, as well as a method for transferring a space payload from one orbit to another. More particularly, the invention relates to a direct fuel supply device used by the orbital towing device for the transfer of space payloads.

PRIOR ART

The orbit insertion of a space payload, for example a satellite or a freight cargo, conventionally includes the steps below.

A vehicle, such as a space launcher, inserts the payload into an intermediate orbit. A propulsion system, for example a propulsion bay or an orbital transfer vehicle then captures the payload in the intermediate orbit to insert it into its final orbit.

In order to meet the needs of satellite operators, and more generally, of customers requiring the stationing of space payloads, one is looking to be able to increase the mass of the payload that can be inserted into the final orbit.

Generally, the orbital transfer vehicle, similar to a towing vehicle, includes a maximised fuel reserve enabling it to perform its orbital transfer mission.

The available fuel resource of the orbital transfer vehicle or propulsion bay thus limits the maximum mass of the payload that can be transferred to the final orbit.

Moreover, the transportation of additional fuel itself results in fuel consumption, which therefore cannot be used for the orbital transfer.

Current solutions must therefore be improved in order to improve performance.

DESCRIPTION OF THE INVENTION

The invention is used to improve the current solutions, and thus proposes a method for transferring a space payload from a first orbit to a second orbit, characterised in that:
the space payload, moving about the first orbit, is attached to a removable orbital towing assistance device including at least one fuel pouch,
said method comprising the steps of:
attaching an orbital transfer vehicle to the removable orbital towing assistance device, and
transferring the space payload and the removable orbital towing assistance device to the second orbit by means of the orbital transfer vehicle.

Advantageously, the invention is complemented by the following characteristics, which can be implemented alone or in any combination technically possible:
whereby the orbital transfer vehicle is previously in orbit, the method comprises the steps of inserting an assembly into orbit, said assembly comprising the space payload and the removable orbital towing assistance device in the first orbit, the assembly of the orbital transfer vehicle to the removable orbital towing assistance device, and the transfer of the assembly to the second orbit by means of the orbital transfer vehicle;
the method includes the step of transferring the contents of the space payload to a target, whereby the space payload remains secured to the towing assistance device;
the method includes the step of separating the space payload from the removable orbital towing assistance device;
the method includes the step of moving the orbital transfer vehicle to another orbit, or of maintaining the orbital transfer vehicle in the second orbit;
the method includes the subsequent step of separating the removable orbital towing assistance device from the orbital transfer vehicle;
the method includes the step of separating the orbital transfer vehicle from the removable orbital towing assistance device, whereby the space payload remains secured to the removable orbital towing assistance device;
the method includes the step of securing the orbital transfer vehicle to a new removable orbital towing assistance device, itself secured to a new space payload;
the propulsion device of the orbital transfer vehicle is directly supplied with fuel by the removable orbital towing assistance device.

The invention further relates to a removable orbital towing assistance device for a space payload and for an orbital transfer vehicle, characterised in that it comprises:
at least one fuel pouch,
a frame to which is secured the fuel pouch, and including:
a first fastening system for its securing to the space payload,
a second fastening system for its securing to the orbital transfer vehicle,
the first and second fastening systems enabling said removable orbital towing assistance device to be secured in a removable manner between the space payload and the orbital transfer vehicle, and
a direct fuel supply module, configured to transfer fuel from the fuel pouch directly to at least one propulsion device of the orbital transfer vehicle, for directly supplying said propulsion device.

Advantageously, the invention is complemented by the following characteristics, which can be implemented alone or in any combination technically possible:
the device includes at least one solar electricity generator covering at least one portion of the frame;
the device includes a plurality of fuel pouches positioned on the outside of the frame and/or inside the frame; the device includes one or more fuel pouches, all of which are positioned on the outside of the frame.

The invention further relates to an assembly comprising a removable orbital towing assistance device and at least one space payload, having at least one fastening device, whereby the removable orbital towing assistance device is secured in a removable manner to the space payload by the cooperation between the fastening device of the space payload and the first fastening system of the removable orbital towing assistance device.

The invention further relates to an assembly comprising a removable orbital towing assistance device as described, at least one space payload having at least one fastening device and one propulsion device, an orbital transfer vehicle having at least one fastening device and one propulsion device, the removable orbital towing assistance device being secured in a removable manner between the space payload and the orbital transfer vehicle, by the cooperation between the fastening device of the space payload and the first fastening system of the removable orbital towing assistance device, and by the cooperation between the fastening device of the orbital transfer vehicle and the second fastening system of the removable orbital towing assistance device, the direct fuel supply module being connected to the propulsion device of the orbital transfer vehicle so as to provide a direct fuel supply to said propulsion device.

The invention has numerous advantages.

The use of a removable, external and modular device allows the inter-orbital payload transfer missions to be multiplied, which constitutes a major factor for economic profitability.

Furthermore, the fuel pouch of the removable assistance device is accompanied by a direct fuel supply means, which simplifies, quickens and reduces the cost of the fuel supply operations. In particular, the orbital transfer vehicle and/or the space payload no longer need to be completely filled with fuel, as the fuel supply takes place directly from the fuel pouch of the removable towing assistance device.

The invention therefore allows for an increase in the mass of the space payload that can be transferred as of its very first mission and all the more so for subsequent missions.

The invention also eases the launch by reducing the overall mass that must be inserted into orbit, and consequently reduces associated costs.

Moreover, the invention increases the life of the inter-orbital transfer vehicle by reducing the duration of the transfers, which are shorter than in cases using a specialised fuel deposit for refuelling.

The invention also reduces the risks associated with the implementation of the orbital transfer vehicle by minimising the number of docking manoeuvres (frequency cut in half compared to mission profiles using a fuel deposit).

Finally, the invention proposes a method for the orbital towing of space payloads that is systematic, reproducible and efficient.

PRESENTATION OF THE FIGURES

Other characteristics, purposes and advantages of the invention are highlighted in the following description, which is provided for illustration purposes only and is not intended to limit the invention. This must be read with reference to the appended illustrations, among which:

FIG. 6 is a diagrammatic illustration of one example of the transfer of payloads according to the invention; and FIG. 7 is a diagrammatic illustration of another example of the transfer of playloads according to the invention.

DETAILED DESCRIPTION

Removable Orbital Towing Assistance Device

Figure 1:
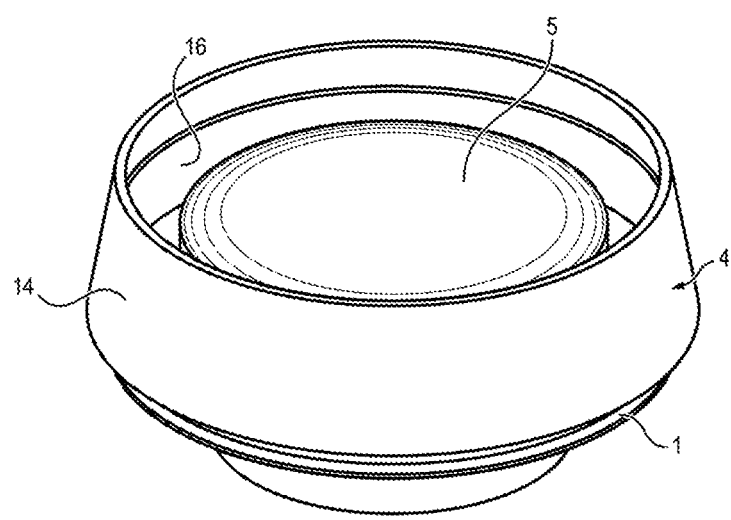
FIG. 1 is a diagrammatic illustration of one embodiment of a removable orbital towing assistance device according to the invention.
Figure 2:
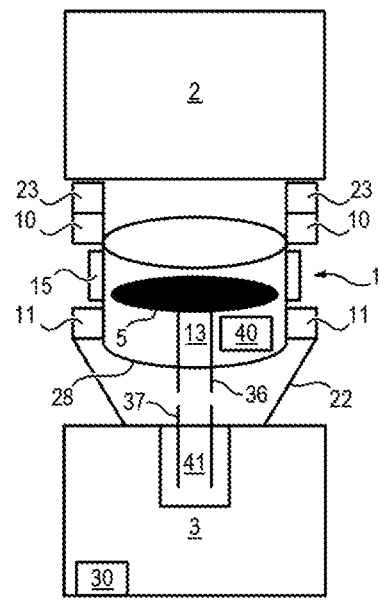
FIG. 2 is a diagrammatic illustration of an assembly comprising a removable orbital towing assistance device equipped with a fuel pouch, secured in a removable manner between an orbital transfer vehicle and a space payload.

FIGS. 1 and 2 show one embodiment of a removable orbital towing assistance device 1 for a space payload 2 and for an orbital transfer vehicle 3.

The space payload 2 is, by way of illustration however not limited hereto, a satellite or freight cargo for a space station.

The orbital transfer vehicle 3 is, for example, a vehicle that can be used for a single mission (such as the ATV) or a vehicle that can be reused for multiple missions, i.e. that can remain in orbit after its mission in order to perform subsequent missions. This is, for example, a vehicle which, in addition to a basic propulsion system for attitude control, further comprises a main electrical or chemical propulsion system.

The removable orbital towing assistance device 1 comprises at least one fuel pouch 5. As explained hereinbelow, the device 1 can include a plurality of these fuel pouches 5. The fuel is intended to be used in particular by a propulsion device 41 of the orbital transfer vehicle 3. The propulsion device 41 is any propulsion device using fuel.

The pouch 5 has an appropriate shape, depending on the volume available in the frame or around the frame, and depending on the volume of fuel to be stored. The pouch 5 is therefore airtight and has one or more controllable openings for transmitting fuel, as explained hereinbelow.

The device 1 further comprises a frame 4, to which is secured the fuel pouch 5.

In FIG. 1, the frame 4 comprises an envelope 14, that is for example ring-shaped, surrounding a housing 16 that can in particular receive a fuel pouch 5.

The fuel pouch 5 is secured to the frame 4, by any appropriate fastening system.

Where relevant, the pouch 5 comprises a fuel cooling system.

As illustrated in FIG. 2, the frame 4 comprises a first fastening system 10 for its securing to the payload 2, and a second fastening system 11 for its securing to the orbital transfer vehicle 3.

The first and second fastening systems 10, 11 enable the device 1 to be secured in a removable manner between the payload 2 and the orbital transfer vehicle 3. In general, the first fastening system 10 is positioned on the opposite side to the second fastening system 11 on the frame 4.

The device 1 can therefore be secured to the space payload 2 and be removed therefrom, thanks to the first removable fastening system 10. Similarly, the device 1 can be secured to the orbital transfer vehicle 3 and be removed therefrom, thanks to the second removable fastening system 11.

The device 1 further comprises a module 13 allowing the fuel to be transferred from the pouch 5 at least to the orbital transfer vehicle 3. When the orbital transfer vehicle 3 is secured to the device 1, this module 13 is used to transmit the fuel required for purposes including propulsion.

The module 13 can in particular include one or more valves, and one or more pipes 36 connected to the fuel pouch 5, or to the plurality of fuel pouches 5, whereby these pipes can be connected to fuel lines 37 of the orbital transfer vehicle 3 for supplying the latter.

More specifically, the module 13 is a direct fuel supply module 13. Therefore, the module 13 is used to directly supply the propulsion device 41 of the orbital transfer vehicle 3. Consequently, the fuel no longer needs to be transferred from the device 1 to a potential storage area of the orbital transfer vehicle 3. The re-pressurisation of the fuel in the orbital transfer vehicle 3 for its storage in a storage area is also no longer necessary.

The propulsion device 41 supplies fuel directly from the fuel pouch 5 of the device 1, without the orbital transfer vehicle 3 having to previously store the fuel in a storage area. In other words, the propulsion device 41 is fed, during operation, directly by drawing fuel from the fuel pouch 5 via the module 13.

The module 13 generally comprises an expansion valve, used to reduce the pressure of the fuel originating from the fuel pouch 5. The fuel thus depressurised is transmitted by the module 13 directly to the fuel lines 37 of the propulsion device, in order to ensure the operation of said propulsion device.

This direct fuel supply makes the operations simpler, less risky, less expensive and of shorter duration.

Where relevant, a processing unit of the device 1 controls the flow rate transferred via the valves, of the controlled opening type. As explained hereinbelow, this processing unit can control other functions of the device 1.

The module 13 can also, where applicable, supply fuel to the space payload 2. The fuel supply takes place in an identical manner, by the communication of the pipes of the module 13 with the fuel lines of the space payload 2. If the space payload 2 comprises a propulsion device, the module 13 can directly supply fuel to the propulsion device of the space payload after separation of the orbital transfer vehicle 3.

If the space payload 2 comprises other sub-systems (other than its propulsion device) that require a fuel supply, the module 13 can directly supply fuel to these sub-systems in a similar manner to that described for the direct fuel supply of the propulsion device of the orbital transfer vehicle 3 or of said space payload 2.

The device 1 thus constitutes a removable and direct fuel supply system.

In order to secure the device 1 to the space payload 2, the first fastening system 10 engages with a fastening device 23 of the space payload 2.

In one example embodiment, the first fastening system 10 is a male, female or planar element, and the fastening device 23 is a female, male or planar element. The first fastening system 10 comprises, for example, a retractable element having a shape that complements the shape of the fastening device 23, which enables the surfaces to be placed and held in contact with each other when necessary, and then enables said surfaces to be separated.

In one example, the holding in position before separation and opening of the systems 10 and 23 takes place by means of a position holding element, such as a strap, exploding nuts or sealing flange. This holding element forms, for example, part of the first fastening system 10.

The activation of the opening of the position holding element results in the separation of the device 1 from the space payload 2. The opening of the position holding element is, for example, controlled in an electromechanical manner by the processing unit 40 of the device 1 and/or by a processing unit of the space payload 2.

In one example embodiment, the first fastening system 10 is standardised and adapts to suit a standard shape of the fastening device 23 of the space payload 2.

The aforementioned examples are, however, not limitative and depend on the applications or the needs of the mission.

Similarly, the second fastening system 11 engages with at least one fastening device 22 of the orbital transfer vehicle 3.

The example embodiments previously described for the first fastening system 10 and the fastening device are applicable in a similar manner and will not therefore be repeated.

In another example embodiment, the fastening device 23 comprises fastening arms or fastening clamps. The first fastening system 10 comprises connection elements at the ends of the fastening arms. The opening/closing of these connection elements (controlled by the processing unit 40 of the device 1), and/or the release/securing of the fastening arms of these connection elements (controlled, for example, by the processing unit of the space payload 2) allow the device 1 to be connected to/separated from the orbital transfer vehicle 3. This embodiment can apply in a similar manner to the first fastening system 10 and to the fastening device 22.

The device 1 is therefore an external element that is independent from the orbital transfer vehicle 3 and from the space payload 2.

In one embodiment, the device 1 comprises at least one solar electricity generator 15. This solar generator 15 covers at least one portion of the frame 4, and is generally positioned on the outer surface of the envelope 14 of the frame 4.

This generator 15 provides electrical energy to the device 1, whereby this energy is used by the device 1 or is transmitted to the orbital transfer vehicle 3 and/or to the space payload 2. In this case, an electrical connection is provided between the device 1 and the space payload 2, and/or the orbital transfer vehicle 3. If necessary, electrical connectors are therefore present on the device 1, the vehicle 3 and/or the space payload 2 for transmitting the aforementioned electrical energy.

In one embodiment, the device 1 comprises a plurality of fuel pouches 5.

These pouches 5 can, for example, be positioned inside the frame 4. Alternatively, the pouches 5 can be positioned outside the frame 4 (for example in contact with the envelope 14). It is also possible to position the pouches 5 both inside the frame 4 and outside the frame 4.

Figure 3:
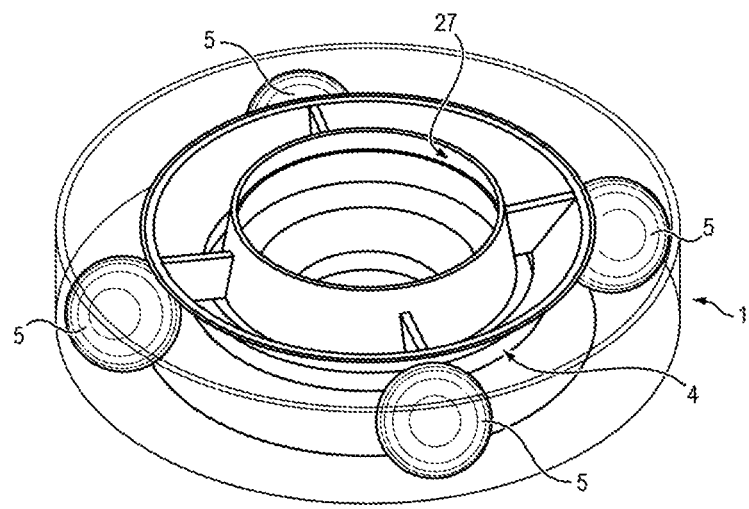
FIG. 3 is a diagrammatic illustration of another embodiment of a removable orbital towing assistance device according to the invention, comprising a plurality of external fuel pouches.

In one example embodiment, all pouches 5 are positioned outside the frame 4 (see FIG. 3.) In this case, the structure 27 of the frame 4 that extends inside the envelope 14, and acting as a support for the space payload 2 (or the vehicle 3), advantageously has a height of less than the envelope 14 of the frame 4.

This enables the height of the space payload 2 (or of the vehicle 3) to be reduced, and thus the compactness of the assembly to be improved, and the stresses to which the payload 2 is subject during its insertion into orbit to be lessened.

In one embodiment, the device 1 comprises at least one visual marker 28 for guiding the docking of the orbital transfer vehicle 3 with the device 1. This can be, by way of a non-limiting example, a target placed on one side of the frame 4.

In this case, the transfer vehicle 3 comprises an optical device 30 used to detect the target, which guides the vehicle during docking manoeuvres.

Other markers can be placed on the device 1, to complement or replace the aforementioned solution, such as light signals. In this case, the vehicle 3 comprises one or multiple detectors configured to detect the markers of the device 1.

Depending on the steps of the mission, different assemblies comprising the device 1 are constituted, as explained hereafter in the description of the method.

A first assembly solely comprises the device 1 and at least one space payload 2, the device 1 being secured in a removable manner to the space payload 2 via the cooperation between the fastening device 23 of the space payload 2 and the first fastening system 10 of the tank 1.

A second assembly comprises the device 1, an orbital transfer vehicle 3 having at least one fastening device 22, the device 1 being secured in a removable manner to the orbital transfer vehicle 3 via the cooperation between the fastening device 22 of the orbital transfer vehicle 3 and the second fastening system 11 of the device 1. In this case, the direct fuel supply module 13 is connected to the propulsion device 41 of the orbital transfer vehicle 3 so as to provide a direct fuel supply to said propulsion device 41.

A third assembly comprises the device 1, at least one space payload 2 having at least one fastening device 23, an orbital transfer vehicle 3 having at least one fastening device 22, the device 1 being secured in a removable manner between the space payload and the orbital transfer vehicle 3, via the cooperation between the fastening device 23 of the space payload 2 and the first fastening system 10 of the device 1, and via the cooperation between the fastening device 22 of the orbital transfer vehicle 3 and the second fastening system 11 of the tank 1. In this case, the direct fuel supply module 13 is connected to the propulsion device 41 of the orbital transfer vehicle 3 so as to provide a direct fuel supply to said propulsion device 41.

Figure 4:
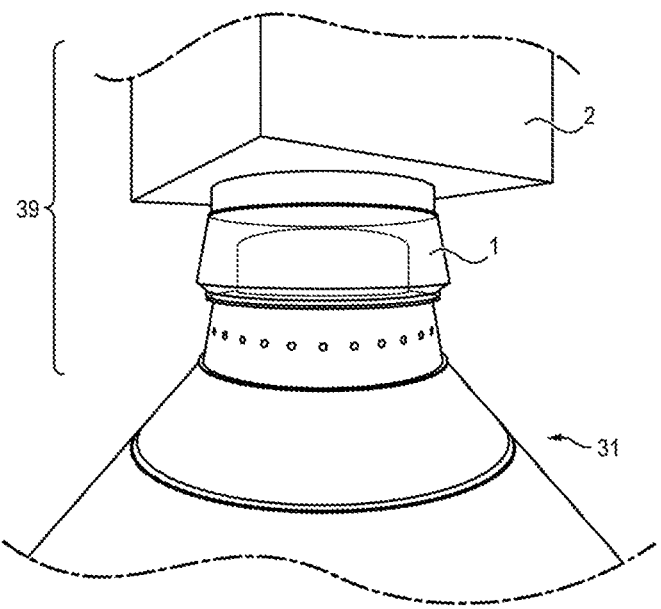
FIG. 4 is a diagrammatic illustration of the upper portion of a launcher supporting a space payload secured to a removable orbital towing assistance device according to the invention.

FIG. 4 shows the upper portion 39 of a space launcher 31. In this illustration, the first assembly comprising the device 1 and the space payload 2 is housed in said upper portion 39. This upper portion 39 is generally covered by a fairing (not shown).

Where relevant, the third aforementioned assembly can also be housed in the space launcher 31 for its insertion into orbit.

Methods for Implementing the Removable Orbital Towing Assistance Device

One embodiment is described of a method for transferring a space payload 2 from a first orbit to a second orbit. The second orbit has, by way of a non-limiting example, a higher altitude than the first orbit.

A space payload 2 moves about the first orbit and is attached to the removable device 1 as described hereinabove and including at least one fuel pouch 5.

The assembly comprising the space payload 2 and the removable device 1 could, for example, have been previously placed in orbit by means of a space launcher.

Figure 5:
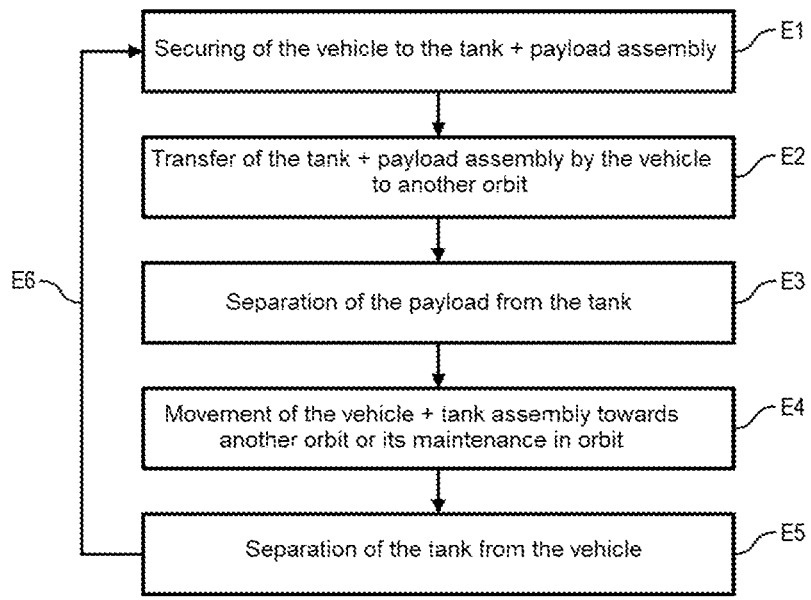
FIG. 5 is a diagrammatic illustration of a transfer method according to the invention.

The method comprises the step E1 (see FIG. 5) of securing the orbital transfer vehicle 3 to the device 1. The orbital transfer vehicle 3 can be in orbit after completing prior missions, or have been launched independently in order to join said assembly.

The attachment of the orbital transfer vehicle 3 in particular comprises a step for guiding the orbital transfer vehicle 3 towards the device 1. This guiding step can in particular take place using the visual marker 28 present on the device 1 and used by the optical device 30 of the vehicle 3 to position itself in a precise manner with regard to the device 1.

The cooperation of the fastening device 22 of the orbital transfer vehicle 3 with the second fastening system 11 of the device 1 enables the vehicle 3 to be secured to the device 1. Where necessary, the processing unit 40 of the device 1 controls the second fastening system 11 and/or the processing unit of the vehicle 3 controls the fastening device 22 in order to guarantee their engagement.

The method includes a step E2 for transferring the space payload 2 and the device 1 to the second orbit by means of the orbital transfer vehicle 3.

In particular, the module 13 is used to transfer fuel from the pouch 5 to the orbital transfer vehicle 3 in order to provide it with the fuel required for the orbit transfer. As previously stated, the propulsion device 41 of the orbital transfer vehicle 3 is directly supplied with fuel by the fuel pouch 5 of the removable device 1.

Once the orbital transfer vehicle 3 has allowed the space payload 2 to reach the orbit and take on the orbital position required by the mission, the method includes the step E3 of separating the space payload 2 from the device 1.

The separation step takes place by the disconnection of the fastening device 23 of the space payload 2 from the first fastening system 10 of the device 1. This disconnection is controlled, where relevant, by a processing unit of the space payload 2 and/or by the processing unit 40 of the device 1.

This results in having the space payload 2 moving about the required orbit on the one hand, and the assembly comprising the transfer vehicle 3 and the device 1 on the other hand.

Alternatively, the step E3 can consist in the transfer of the contents of the space payload 2 to an infrastructure or target destination. In this case, the space payload 2 remains secured to the device 1 and only its contents are transferred.

The orbital transfer vehicle 3 associated with the device 1 can remain in this orbit. Alternatively, the method comprises the step E4 according to which the assembly enters another orbit, for example an orbit referred to as a "parking" orbit.

The method can include the step E5 of separating the device 1 from the orbital transfer vehicle 3. The separation step takes place by the disconnection of the fastening device 22 of the orbital transfer vehicle 3 from the second fastening system 11 of the device 1. This disconnection is controlled, where relevant, by a processing unit of the vehicle 3 and/or by the processing unit 40 of the device 1. If the space payload 2 is still secured to the device 1 (for example in the aforementioned case where only the contents of the space payload 2 are transferred), the separation of the device 1 further enables the separation of the space payload 2 from the vehicle 3.

The device 1 thus re-enters the atmosphere for disintegration, or remains in the orbit in which the vehicle 3 is located.

On one example embodiment, once the orbital transfer vehicle 3 has transferred the assembly comprising the space payload 2 and the device 1 to the second orbit, the method comprises the step of separating the device 1 from the orbital transfer vehicle 3, whereby the space payload 2 remains secured to the device 1. This alternative reduces space debris, as the device 1 remains secured to the space payload 2. The orbital transfer vehicle 3 can remain in its current orbit, or attach itself to another assembly comprising a payload and a tank, or use propulsion resources specific to it to join another orbit.

The method is used to successively perform a plurality of orbital payload transfers.

Therefore, the method can include the step E6 of securing the orbital transfer vehicle 3 to a new device 1, itself secured to a new space payload 2. The assembly comprising the new tank and the new space payload 2 is launched by a launcher in the orbit into which the vehicle 3 is located, so that the vehicle 3 reattaches itself to the new device 1.

The steps described hereinabove (E2 to E5) can be repeated, and so on and so forth.

It is thus understood that the removable towing assistance device 1 therefore allows a plurality of orbital transfers to take place and thus increases the mass of the transferable space payload 2.

One example embodiment of a transfer method is described with reference to FIG. 6.

A space launcher 35 comprises on one level, generally the upper level, an assembly including a device 1 secured between a payload 2 and an orbital transfer vehicle 3.

In this instance, the space payload 2 is a cargo module containing freight 32 destined for an orbital infrastructure 34.

After inserting the assembly into a first orbit O1, the orbital transfer vehicle 3 activates is propulsion system, which is directly supplied with fuel by the device 1, to transfer the assembly of which it is part to the orbit O3 of the orbital infrastructure 34 targeted. The freight contents 32 of the space payload 2 are transferred to the infrastructure 34, for example after the docking of the space payload 2.

Therefore, the method allows a payload to be transferred during its first mission.

The vehicle 3 re-enters the orbit O1, whereafter the method includes a step of separating the device 1 (and consequently the payload 2) from the vehicle 3. The assembly comprising the device 1 and the payload 2 can, where relevant, re-enter the atmosphere.

Alternatively, as illustrated in FIG. 7, the vehicle 3 re-enters the orbit O1, whereafter the method comprises a step for separating the space payload 2, which can, where relevant, re-enter the atmosphere.

The vehicle 3 then heads towards a parking orbit O2, awaiting a new mission (the vehicle 3 uses its main propulsion to achieve this). Alternatively, in the embodiment illustrated in FIG. 3, the vehicle 3 can use the fuel that is supplied to it by the device 1.

The method then includes the sending of a new space payload 2' comprising a new freight cargo 32', secured to a new device 1', towards the orbit O1, via the space launcher 35.

This time, the mass of the freight can be increased, given that the vehicle 3 is already in orbit.

The vehicle 3 then leaves the orbit O2 to re-enter the orbit O1 to attach itself to the device 1' (step referred to as the encounter or docking step). This step can, for example, include the use of the optical device 30 of the vehicle 3, which allows for the detection of the visual marker 28 of the device 1.

In the alternative embodiment in FIG. 7, the vehicle 3 travels down from the orbit O2 towards the orbit O1. Before docking with the new device 1', the device 1 is separated from the vehicle 3, and where relevant, re-enters the atmosphere.

The orbital transfer to the orbit O3 in which the target infrastructure is located can then begin again as previously described. A plurality of transfer missions can thus take place. By way of a non-limiting example, five or ten missions are performed.

The invention therefore proposes a device and a method for the orbital towing of space payloads.

Other uses of the device 1 can be implemented depending on the needs and specifications of the missions.

The invention claimed is:

1. A unit comprising:
   at least one space payload having at least one payload fastening device;
   an orbital transfer vehicle having at least one transfer vehicle fastening device and at least one propulsion device; and
   a removable orbital towing assistance device for the at least one space payload and for the orbital transfer vehicle, the removable orbital towing assistance device comprising:
      a lenticular fuel pouch configured to hold pressurized fuel,
      a ring-shaped frame to which is secured the lenticular fuel pouch, the ring-shaped frame having a ring-shaped rib extending from an inner surface of the ring-shaped frame; and
      a direct fuel supply module connected to the at least one propulsion device of the orbital transfer vehicle, wherein:
   the ring-shaped frame includes
      a first fastening system configured to connect to the at least one space payload, and
      a second fastening system configured to connect to the orbital transfer vehicle, and
      the direct fuel supply module is configured to transfer fuel from the lenticular fuel pouch directly to the at least one propulsion device of the orbital transfer vehicle, wherein the direct fuel supply module includes an expansion valve to depressurize the fuel from the lenticular fuel pouch,
   further wherein, the removable orbital towing assistance device is configured to secure in a removable manner between the at least one space payload and the orbital transfer via cooperation between the at least one payload fastening device of the space payload and the first fastening system of the removable orbital towing assistance device, and via the cooperation between the at least one transfer vehicle fastening device of the orbital transfer vehicle and the second fastening system of the removable orbital towing assistance device.

2. The unit according to claim 1, comprising at least one solar electricity generator covering at least one portion of the ring-shaped frame.

3. The unit according to claim 2, wherein the lenticular fuel pouch is positioned on the outside of the ring-shaped frame.

4. The unit according to claim 1, wherein the lenticular fuel pouch includes a plurality of lenticular fuel pouches positioned on the outside of the ring-shaped frame and/or inside of the ring-shaped frame.

* * * * *